US006510994B1

(12) United States Patent
Zhu et al.

(10) Patent No.: US 6,510,994 B1
(45) Date of Patent: Jan. 28, 2003

(54) TRIGGERING METHOD FOR A PRODUCE RECOGNITION SYSTEM

(75) Inventors: Jie Zhu, Fairport, NY (US); Daniel B. Seevers, Duluth, GA (US)

(73) Assignee: NCR Corporation, Dayton, OH (US)

( * ) Notice: Subject to any disclaimer, the term of this patent is extended or adjusted under 35 U.S.C. 154(b) by 43 days.

(21) Appl. No.: 09/684,416

(22) Filed: Oct. 6, 2000

(51) Int. Cl.[7] .................................................. G06K 7/10
(52) U.S. Cl. .................................. 235/454; 235/462.11
(58) Field of Search ................................ 235/385, 378, 235/383, 454, 462.01, 462.11, 462.14, 462.41, 462.42; 705/20, 22, 23, 24

(56) References Cited

U.S. PATENT DOCUMENTS

| | | | | |
|---|---|---|---|---|
| 4,365,148 A | * 12/1982 | Whitney | | 235/383 |
| 4,693,330 A | 9/1987 | Uchimura et al. | | |
| 5,021,645 A | * 6/1991 | Satula et al. | | 250/223 R |
| 5,115,888 A | * 5/1992 | Schneider | | 186/61 |
| 5,166,755 A | 11/1992 | Gat | | |
| 5,546,475 A | 8/1996 | Bolle et al. | | |
| 5,867,265 A | 2/1999 | Thomas | | |
| 6,155,489 A | * 12/2000 | Collins, Jr. et al. | | 235/462.01 |
| 6,332,573 B1 | * 12/2001 | Gu et al. | | 235/462.06 |

* cited by examiner

*Primary Examiner*—Daniel St.Cyr
(74) *Attorney, Agent, or Firm*—Paul W. Martin; Priest & Goldstein, PLLC

(57) ABSTRACT

A triggering method for a produce recognition system which uses historical ambient light level readings. The method includes the steps of obtaining first ambient light levels from an ambient light sensor of the produce data collector with a data collection aperture covered, obtaining second ambient light levels from the ambient light sensor with the data collection aperture uncovered, determining a threshold ambient light level from the first ambient light levels and a difference between the first and second ambient light levels, obtaining a third ambient light level from the ambient light sensor with a produce item adjacent the data collection aperture, comparing the third ambient light level to the threshold ambient light level, and capturing data associated with the produce item if the third ambient light level is less than the threshold ambient light level.

7 Claims, 3 Drawing Sheets

TRIGGERING METHOD FOR A PRODUCE RECOGNITION SYSTEM

CROSS REFERENCE TO RELATED APPLICATIONS

The present invention is related to the following commonly assigned and U.S. application:

"A Produce data collector And A Produce Recognition System", filed Nov. 10, 1998, invented by Gu, and having a Ser. No. 09/189,783.

BACKGROUND OF THE INVENTION

The present invention relates to product checkout devices and more specifically to a triggering method for a produce recognition system.

Bar code readers are well known for their usefulness in retail checkout and inventory control. Bar code readers are capable of identifying and recording most items during a typical transaction since most items are labeled with bar codes.

Items which are typically not identified and recorded by a bar code reader are produce items, since produce items are typically not labeled with bar codes. Bar code readers may include a scale for weighing produce items to assist in determining the price of such items. But identification of produce items is still a task for the checkout operator, who must identify a produce item and then manually enter an item identification code. Operator identification methods are slow and inefficient because they typically involve a visual comparison of a produce item with pictures of produce items, or a lookup of text in table. Operator identification methods are also prone to error, on the order of fifteen percent.

A produce recognition system is disclosed in the cited co-pending application. A produce item is placed over a window in a produce data collector, the produce item is illuminated, and the spectrum of the diffuse reflected light from the produce item is measured. A terminal compares the spectrum to reference spectra in a library to determine a list of candidate identifications.

The produce recognition system triggers illumination and data capture if ambient light levels fall below a threshold. This method works well under certain lighting conditions, but may not work well under other conditions, especially darker operating conditions. Operator intervention may be required if the produce data collector does not trigger when the produce item is first placed over the window of the produce data collector.

Therefore, it would be desirable to provide a triggering method which functions under a wider range of lighting conditions without operator intervention.

SUMMARY OF THE INVENTION

In accordance with the teachings of the present invention, a triggering method for a produce recognition system is provided.

The method includes the steps of obtaining first ambient light levels from an ambient light sensor of the produce data collector with a data collection aperture covered, obtaining second ambient light levels from the ambient light sensor with the data collection aperture uncovered, determining a threshold ambient light level from the first ambient light levels and a difference between the first and second ambient light levels, obtaining a third ambient light level from the ambient light sensor with a produce item adjacent the data collection aperture, comparing the third ambient light level to the threshold ambient light level, and capturing data associated with the produce item if the third ambient light level is less than the threshold ambient light level.

It is accordingly an object of the present invention to provide a triggering method for a produce recognition system.

It is another object of the present invention to provide a triggering method for a produce recognition system which works under a wide range of lighting conditions.

It is another object of the present invention to provide a triggering method for a produce recognition system which minimizes operator intervention.

It is another object of the present invention to provide a triggering method for a produce recognition system which dynamically adjusts the triggering threshold based upon ambient light level histories.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
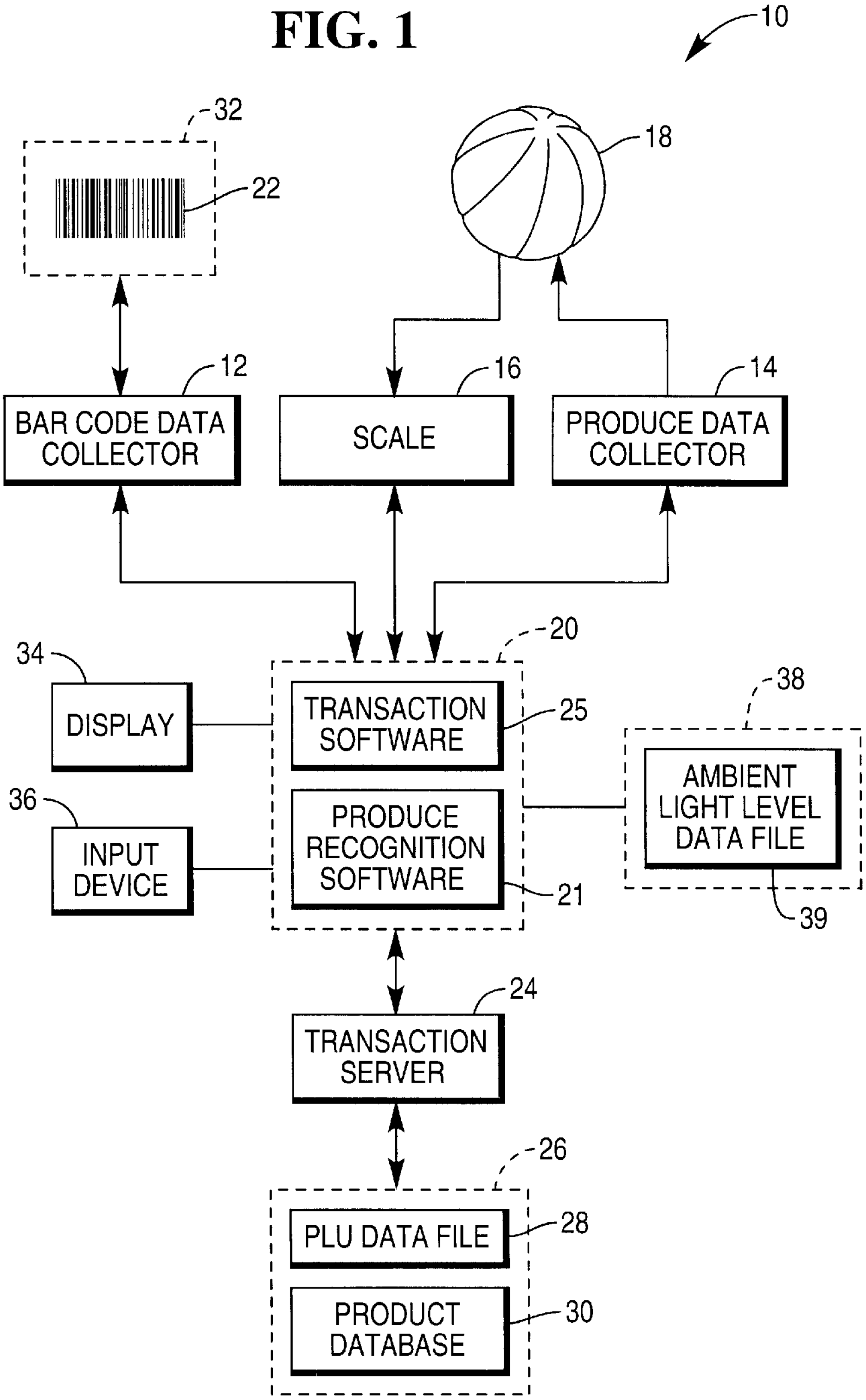
FIG. 1 is a block diagram of a transaction processing system including a produce recognition system.

Referring now to FIG. 1, transaction processing system 10 includes bar code data collector 12, produce data collector 14, and scale 16.

Bar code data collector 12 reads bar code 22 on merchandise item 32 to obtain an item identification number, also know as a price look-up (PLU) number, associated with item 32. Bar code data collector 12 may be any bar code data collector, including an optical bar code scanner which uses laser beams to read bar codes. Bar code data collector 12 may be located within a checkout counter or mounted on top of a checkout counter.

Produce data collector 14 collects data for produce item 18. Such data may include color and color distribution data, size data, shape data, surface texture data, and aromatic data. Reference produce data is collected and stored within produce database 30. During a transaction, produce data collector 14 is preferably self-activated upon a drop of ambient light.

Transaction terminal 20 and produce data collector 14 are the primary components of the produce recognition system.

Scale 16 determines a weight for produce item 18. Scale 16 works in connection with bar code data collector 12, but may be designed to operate and be mounted separately. Scale 16 sends weight information for produce item 18 to transaction terminal 20 so that transaction terminal 20 can determine a price for produce item 18 based upon the weight information.

Bar code data collector 12 and produce data collector 14 operate separately from each other, but may be integrated together. Bar code data collector 12 works in conjunction with transaction terminal 20 and transaction server 24. Scale 16 may also work in connection with bar code data collector 12, but may be designed to operate and be mounted separately.

Storage medium 26 preferably includes one or more hard disk drives. Produce database 30 is preferably stored within storage medium 26, but may also be located instead at transaction terminal 20 in storage medium 38. PLU data file 28 is stored within storage medium 26, but may be located instead at transaction terminal 20 in storage medium 38 or within the memory of bar code data collector 12.

Display 34 and input device 36 may be part of a touch screen or located separately.

In the case of bar coded items, transaction terminal 20 obtains the item identification number from bar code data collector 12 and retrieves a corresponding price from PLU data file 28 through transaction server 24.

In the case of non-bar coded produce items, transaction terminal 20 executes produce recognition software 21 which obtains produce characteristics of produce item 18 from produce data collector 14, identifies produce item 18 by comparing produce data in produce database 30 with collected produce data, and retrieves an item identification number from produce database 30 and passes it to transaction software 25, which obtains a corresponding price from PLU data file 28.

In an alternative embodiment, preliminary identification of produce item 18 may be handled by transaction server 24. Transaction server 24 receives collected produce characteristics and compares them with produce data in produce database 30. Transaction server 24 provides a candidate list to transaction terminal 20 for display and final selection. Following identification, transaction server 24 obtains a price for produce item 18 and forwards it to transaction terminal 20.

To assist in proper identification of produce items, produce recognition software 21 additionally displays a number of candidate identifications for operator selection and verification. Produce recognition software 21 preferably arranges the candidate identifications in terms of probability of match and displays their images in predetermined locations on operator display 34 of transaction terminal 20. The operator may accept the most likely candidate returned by produce recognition software 21 or override it with a different choice using input device 36.

Figure 2:
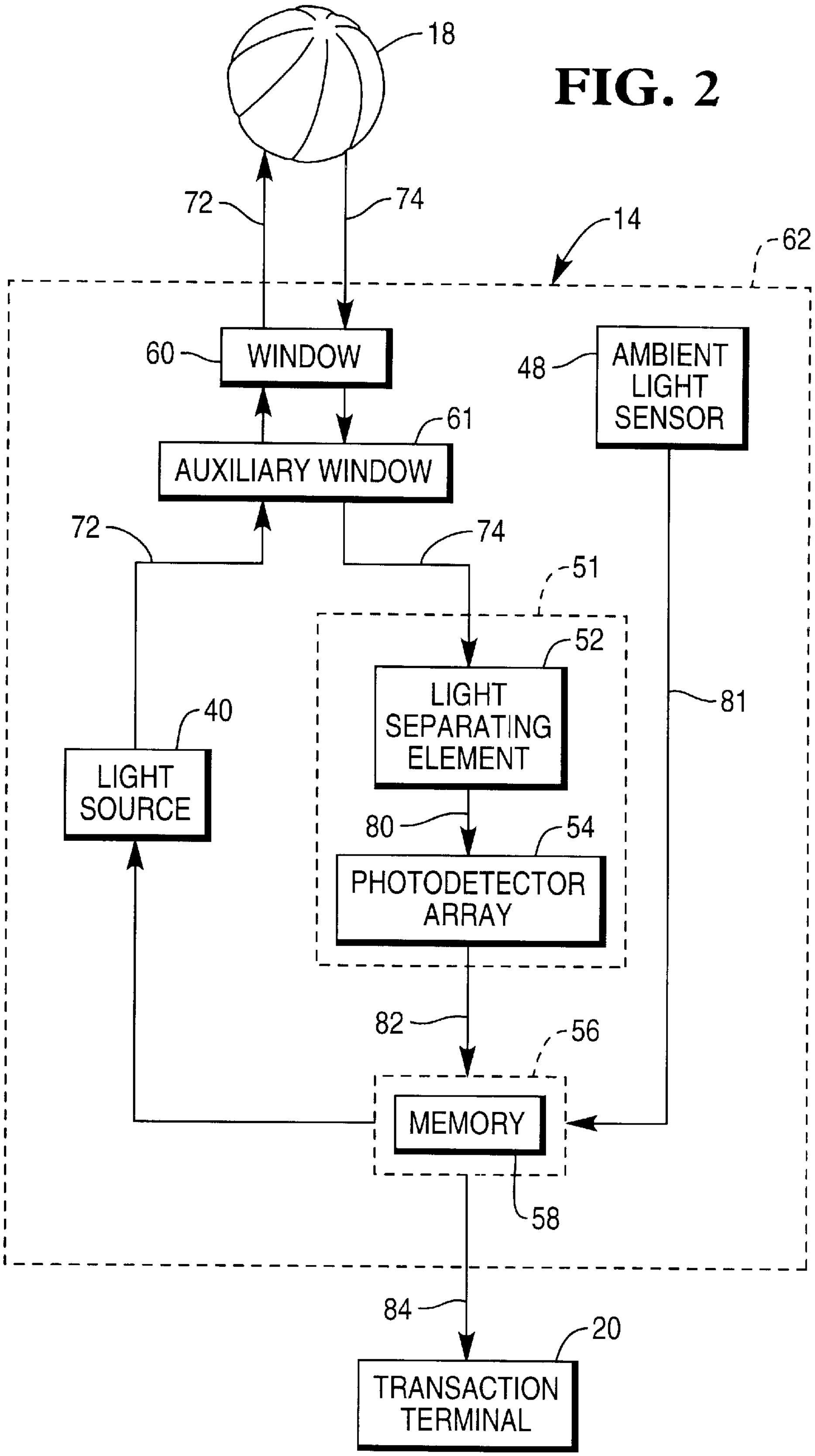
FIG. 2 is a block diagram of a type of produce data collector.

Turning now to FIG. 2, an example produce data collector 14 which relies on spectroscopic analysis is illustrated. Other types of produce data collectors are also envisioned.

Example produce data collector 14 primarily includes light source 40, spectrometer 51, control circuitry 56, transparent window 60, and housing 62.

Light source 40 produces light 70. Light source 40 preferably produces a white light spectral distribution, and preferably has a range from four hundred 400 nm to 700 nm, which corresponds to the visible wavelength region of light.

Light source 40 preferably includes one or more light emitting diodes (LEDs). A broad-spectrum white light producing LED, such as the one manufactured by Nichia Chemical Industries, Ltd., is preferably employed because of its long life, low power consumption, fast turn-on time, low operating temperature, good directivity. Alternate embodiments include additional LEDs having different colors in narrower wavelength ranges and which are preferably used in combination with the broad-spectrum white light LED to even out variations in the spectral distribution and supplement the spectrum of the broad-spectrum white light LED.

Other types of light sources 40 are also envisioned by the present invention, although they may be less advantageous than the broad spectrum white LED. For example, a tungsten-halogen light may be used because of its broad spectrum, but produces more heat.

A plurality of different-colored LEDs having different non-overlapping wavelength ranges may be employed, but may provide less than desirable collector performance if gaps exist in the overall spectral distribution.

Ambient light sensor 48 senses the level of ambient light through windows 60 and 61 and sends ambient light level signals 81 to control circuitry 56. Ambient light sensor 48 is mounted anywhere within a direct view of window 61.

Spectrometer 51 includes light separating element 52 and photodetector array 54.

Light separating element 52 splits light 76 in the preferred embodiment into light 80 of a continuous band of wavelengths. Light separating element 52 is preferably a linear variable filter (LVF), such as the one manufactured by Optical Coating Laboratory, Inc., or may be any other functionally equivalent component, such as a prism or a grating.

Photodetector array 54 produces waveform signals 82 containing spectral data. The pixels of the array spatially sample the continuous band of wavelengths produced by light separating element 52, and produce a set of discrete signal levels. Photodetector array 54 is preferably a complimentary metal oxide semiconductor (CMOS) array, but could be a Charge Coupled Device (CCD) array.

Control circuitry 56 controls operation of produce data collector 14. Control circuitry 56 produces digitized produce data waveform signals 84. Control circuitry 56 compares ambient light level readings from ambient light sensor 48 with the threshold and triggers operation when the ambient light level readings are lower than the ambient light level threshold. Control circuitry 56 includes an analog-to-digital (A/D) converter. A twelve bit A/D converter with a sampling rate of 22–44 kHz produces acceptable results.

Control circuitry 56 also controls triggering of light source 40 and capture of analog produce data signals 82 from spectrometer 51, although produce recognition software 21 may alternatively handle this task. Control circuitry 56 uses an ambient light threshold stored within memory 58 by produce recognition software 21. Control circuitry 56 collects ambient light levels during operation, i.e., when produce item 18 is over produce data collector 14 and when produce item 18 is not over produce data collector 14.

Produce recognition software 21 stores light level information in ambient light level data file 39, which is preferably stored in storage medium 38. Produce recognition software 21 determines average light and dark levels from the light level information and programs control circuitry 56 with a threshold ambient light level between the light and dark levels so that control circuitry 56 may properly trigger illumination and data capture. Produce recognition software 21 may automatically update the ambient light level threshold on a regular basis.

Transparent window 60 is mounted above auxiliary transparent window 61. Windows 60 and 61 include an antireflective surface coating to prevent light 72 reflected from windows 60 and 61 from contaminating reflected light 74.

Housing 62 contains light source 40, ambient light sensor 48, spectrometer 51, photodetector array 54, control circuitry 56, auxiliary transparent window 61, and transparent window 60.

Figure 3:
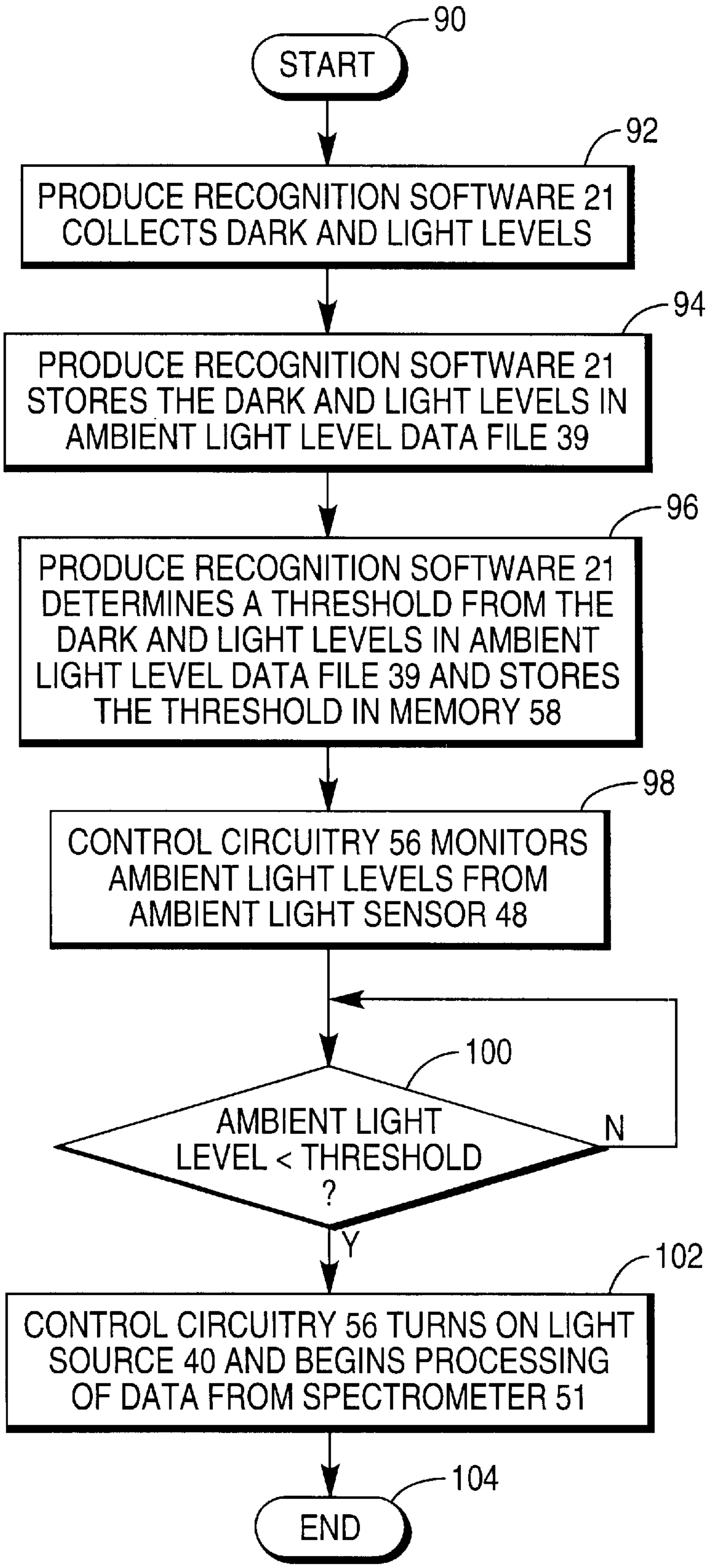
FIG. 3 is a flow diagram illustrating the produce recognition method of the present invention.

Turning now to FIG. 3, the triggering method of the present invention begins with START 90.

In step 92, produce recognition software 21 collects light and dark ambient light levels. The light levels are taken with nothing over window 60 and light source 40 off. The dark levels are taken with a reference over window 60 and light source 40 off. A suitable reference is a white piece of plastic which completely covers window 60 so as to block ambient light from entering window 60.

Due to the constraint of storage space in produce data collector 14, the most effective method of storing the history of dark and light levels has proven to be the weighted average method as described below. The current average $A_t$ of the recent dark levels is computed using:

$$A_t=(1-k)A_{t-1}+kD_t,$$

where t denotes the current sampling time, $D_t$ is the current measure of dark level, and constant k is a tunable number between 0 and 1. Constant k can be considered as a "forgetting factor" which controls how fast the history is forgotten in computing the average. The larger the value of k, the quicker the history is forgotten. In reality, k is tuned to an optimal value by experimentation.

Likewise, the current average $B_t$ of recent light levels is computed using the same method, while substituting the current dark level $D_t$ with the light level $L_t$:

$$B_t=(1-k)B_{t-1}+kL_t.$$

In step 94, produce recognition software 21 stores the light and dark ambient light levels in ambient light level data file 39.

In step 96, produce recognition software 21 determines a threshold from the light and dark ambient light levels and stores the threshold in memory 58. The triggering threshold $T_t$ is then determined from the current average of dark and light levels as follows:

$$T_t=A_t+p(B_t-A_t),$$

where p is a weight or tunable value between 0 and 1.

In step 98, control circuitry 56 monitors ambient light levels from ambient light sensor 48.

In step 100, control circuitry 56 waits for ambient light levels to fall below the threshold in memory 58. If they do, operation proceeds to step 102.

In step 102, control circuitry 56 turns on light source 40 and begins processing of data from spectrometer 51. The method ends in step 104.

Produce recognition software 21 obtains digital produce data from control circuitry 56 and determines a list of candidate identifications from produce database 30. Produce recognition software 21 additionally displays a number of the candidate identifications on display 34 for operator verification and selection using input device 36.

Transaction terminal 20 uses the identification information to obtain a unit price for produce item 18 from transaction server 24. Transaction terminal 20 then determines a total price by multiplying the unit price by weight information from scale 16.

Although the invention has been described with particular reference to certain preferred embodiments thereof, variations and modifications of the present invention can be effected within the spirit and scope of the following claims.

We claim:

1. A produce data collector comprising:

a housing containing an aperture;

means within the housing for capturing data associated with a produce item;

an ambient light sensor in the housing for producing ambient light level signals; and control circuitry in the housing for obtaining first ambient light levels from the ambient light sensor with the aperture covered by a reference to block entry of ambient light and second ambient light levels from the ambient light sensor with the aperture uncovered, and for activating the data capturing means with the produce item in a data collection position adjacent the aperture when a current ambient light level is less than a threshold ambient light level determined from a summation of the first ambient light levels plus a difference between the first and second ambient light levels.

2. The produce data collector as recited in claim 1, wherein the control circuitry comprises a memory for storing the threshold ambient light level.

3. A produce data collector comprising:

a housing containing an aperture;

a light source in the housing for illuminating a produce item;

a spectrometer in the housing for capturing wavelength information associated with the produce item from light reflected from the produce item;

an ambient light sensor in the housing for producing ambient light level signals; and control circuitry in the housing for obtaining first ambient light levels from the ambient light sensor with the aperture covered by a reference to block entry of ambient light and second ambient light levels from the ambient light sensor with the aperture uncovered, and for activating the light source and capturing the wavelength information with the produce item in a data collection position adjacent the aperture when a current ambient light level is less than a threshold ambient light level determined from a summation of the first ambient light levels plus a difference between the first and second ambient light levels.

4. A triggering method for a produce data collector comprising the steps of:

(a) obtaining first ambient light levels from an ambient light sensor of the produce data collector with a data collection aperture covered by a reference to block entry of ambient light;

(b) obtaining second ambient light levels from the ambient light sensor with the data collection aperture uncovered;

(c) determining a threshold ambient light level from a summation of the first ambient light levels plus a difference between the first and second ambient light levels;

(d) obtaining a third ambient light level from the ambient light sensor with a produce item adjacent the data collection aperture;

(e) comparing the third ambient light level to the threshold ambient light level; and (f) capturing data associated with the produce item if the third ambient light level is less than the threshold ambient light level.

5. The method as recited in claim 4, wherein step (c) comprises the substeps of:

(c-1) determining a first average of the first ambient light levels;

(c-2) determining a second average of the second ambient light levels;

(c-3) determining a difference between the first and second averages;

(c-4) weighting the difference; and (c-5) adding a weighted difference to the first average.

6. A triggering method for a produce data collector comprising the steps of:

(a) obtaining first ambient light levels from an ambient light sensor of the produce data collector with a data collection aperture covered by a reference to block entry of ambient light;

(b) obtaining second ambient light levels from the ambient light sensor with the data collection aperture uncovered;

(c) determining a threshold ambient light level from a summation of the first ambient light levels plus a difference between the first and second ambient light levels;

(d) obtaining a third ambient light level from the ambient light sensor with a produce item adjacent the data collection aperture;

(e) comparing the third ambient light level to the threshold ambient light level; and (f) activating a light source and capturing wavelength information associated with the produce item if the third ambient light level is less than the threshold ambient light level.

7. The method as recited in claim 6, wherein step (c) comprises the substeps of:

(c-1) determining a first average of the first ambient light levels;

(c-2) determining a second average of the second ambient light levels;

(c-3) determining a difference between the first and second averages;

(c-4) weighting the difference; and (c-5) adding a weighted difference to the first average.

* * * * *